L. O. COLVIN.
Cow Milker.
No. 37,676.
Patented Feb. 17, 1863.
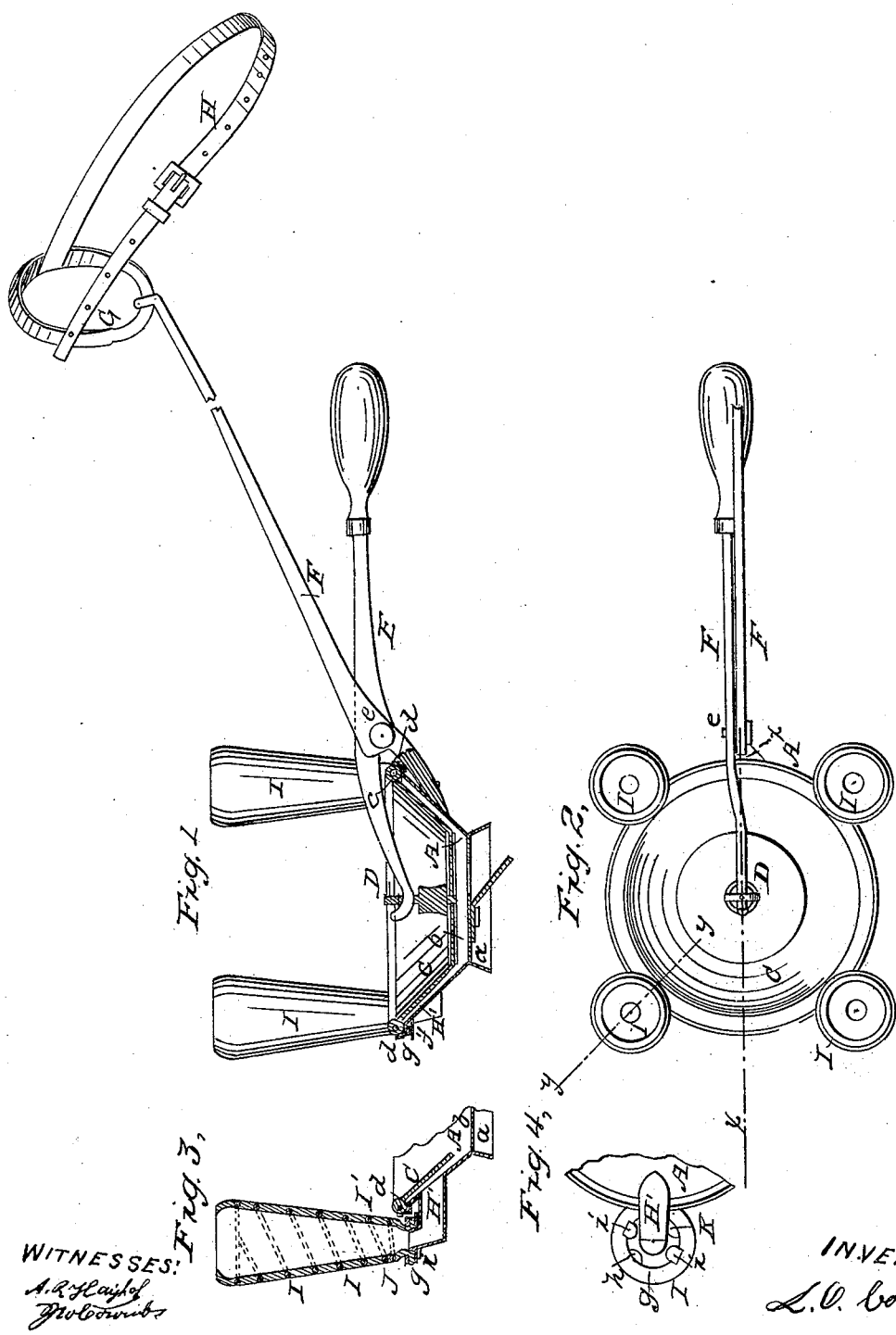

UNITED STATES PATENT OFFICE.

L. O. COLVIN, OF PHILADELPHIA, PENNSYLVANIA.

IMPROVEMENT IN COW-MILKERS.

Specification forming part of Letters Patent No. 37,676, dated February 17, 1863.

*To all whom it may concern:*

Be it known that I, L. O. COLVIN, of Philadelphia, in the county of Philadelphia and State of Pennsylvania, have invented a new and Improved Cow-Milking Device; and I do hereby declare that the following is a full, clear, and exact description of the same, reference being had to the accompanying drawings, making a part of this specification, in which—

Figure 1 is a vertical central section of my invention, taken in the line $x\,x$, Fig. 2; Fig. 2, a plan or top view of the same; Fig. 3, a detached vertical section of one of the elastic teat-tubes pertaining to the same, taken in the line $y\,y$, Fig. 3; Fig. 4, a bottom view of a portion of the same, showing the manner in which the teat-tubes are attached to the pan or receiver.

Similar letters of reference indicate corresponding parts in the several figures.

The object of this invention is to obtain a cow-milking device of simple construction, and which will be more under the control of the operator than those previously constructed, capable of being used or operated with greater facility, more readily cleansed, and which will have a more natural sucking or drawing action upon the teats of the cow, closely resembling that given by a calf in sucking.

The invention consists in the employment or use of a pan or receiver provided with a valve at its bottom, and also having an arm or handle attached to it, which is secured to the operator by means of a shoulder-strap and body-band. The cover of the pan or receiver is composed of a piece of india-rubber, the latter being secured to the former in a novel way, and provided with a lever, the above parts being used in connection with teat-tubes constructed in such a manner as to insure a proper action upon the teats of the cow, and connected to the pan or receiver in such a way that they may be readily attached to and detached from the latter.

To enable those skilled in the art to fully understand and construct my invention, I will proceed to describe it.

A represents a pan or receiver, which may be constructed of sheet metal—tinned plate, for instance—and of any suitable dimensions. This pan or receiver may be of flaring form—that is to say, larger in diameter at its top than at its bottom—as shown in Fig. 1, and to its bottom, around the outer edge of the latter, there is attached a conical flange, $a$. In the bottom $b$ of the pan or receiver there is placed a valve, B, opening downward. (See Fig. 1.)

C represents a piece of india-rubber or other suitable flexible material, which forms the cover of the pan or receiver, and also serves as a piston for the device. This cover or piston has a wire, $c$, secured in its outer edge, said wire being bent in circular form, and of such a diameter that it may spring within a flange, $d$, which is secured to the upper edge of the pan or receiver. (See Figs. 1 and 3.) By this means the cover or piston may be very readily adjusted to the pan or receiver and also readily detached from it. This cover or piston is of circular form, but is made of larger diameter than the top of the pan or receiver, in order that it may have a necessary degree of play or vibration in operating as a piston, and it has a metal eye, D, attached centrally to it, into which the front end of a lever, E, is fitted, the front end of said lever being slightly curved in hook form, as shown more particularly in Fig. 1.

F represents an arm, which is firmly attached to the pan or receiver, and has a strap, G, at its outer end, which is buckled around the upper part of the arm of the operator adjoining the shoulder, and H is a strap, which is attached to the shoulder-strap G, and extends around the body of the operator, holding the strap G in proper position. The arm F is of such a length that it will admit of the pan or receiver being held in proper working position when the arm F is attached to the operator. The lever E has its fulcrum-pin $e$ passing through the arm F, near its junction with the pan or receiver A. The pan or receiver has four tubes, H', attached to it at equal distances apart. These tubes extend outward horizontally a suitable distance, and they project upward, as shown at $f$, the latter parts, just below their upper ends, having circular plates $g$ fitted on them horizontally, said plates having two notches, $h\,h$, made in them at opposite points, as shown in Fig. 4.

I represents the teat-tubes, which are constructed of india-rubber, having a wire, I', bent spirally and fitted within the india-rubber, as shown in Fig. 2, and around the lower end of each teat-tube there is fitted a metal ring, J. These rings are each provided with two hooks, $i\ i$, which catch under the circular plates $g$, and secure the teat-tubes to the tubes $H'$, the upper ends of the parts $f$ of which fit into the lower ends of the teat-tubes. (See Fig. 2.) The hooks $i\ i$, in fitting the teat-tubes to the tubes $H'$, pass into the notches $h\ h$ in the edges of the plates $g$, so that the hooks may be turned to catch over the edges of said plates.

The device is used as follows: The arm F is attached to the shoulder of the operator by means of the straps G H, and the left hand grasps the arm F, while the lever E is operated by the right hand. The teat-tubes are fitted onto the teats of the cow, and as the lever E is operated the cover or piston C is worked up and down. As the cover or piston rises a vacuum is produced in the pan or receptacle A, and the milk is thereby drawn from the teats through the tubes $H'$ into the pan or receptacle A, and as said piston or cover is forced down the milk is ejected from the pan or receptacle through the valve B into a receptacle prepared to receive it. By having the india-rubber teat-tubes I constructed with a spiral wire, $I'$, said tubes are prevented from collapsing or hugging the teat too closely under the suction, and are made to act with a gradual pressure and draw to favor the flow of the milk from the teats and not to prevent its free discharge, as would be the case were a tube constructed wholly of india-rubber employed. By having the pan or receptacle detached from any fixture or article that is designed to be stationary during the milking operation—as a milk-pail, for instance—the pan or receptacle is allowed to gently rise and fall under the working of the lever E. This movement greatly facilitates the suction and draw of the milk from the teats, and the operator also is permitted to incline the pan or receptacle in any direction, as may be required. This cannot be done with those cow-milkers which are attached to milk-pails.

All parts of the device are rendered accessible for cleaning with the greatest facility. The cover or piston C, for instance, may be detached from the pan or receptacle by simply slipping the wire $c$ out from the flange $d$ at the top of the pan or receptacle, and the teat-tubes I may be detached from the tubes $H'$ of the pan or receptacle by turning the teat-tubes and hooks $i\ i$ of the rings J until the hooks come in line with the notches $h\ h$ of the plates $g$.

The device also may be constructed at a very reasonable cost, and it has no parts liable to get out of repair or become deranged by use.

I would remark that if necessary an india-rubber tube may be fitted on the flange $a$ of the pan or receiver to conduct the milk into the pail.

Having thus described my invention, what I claim as new, and desire to secure by Letters Patent, is—

1. The pan or receptacle A, provided with the arm F, having the straps G H attached to it, in combination with the india-rubber or other suitable flexible cover or piston C, lever E, and teat-tubes I, all arranged to operate substantially as and for the purpose herein set forth.

2. Providing the teat-tubes I each with a spiral wire, $I'$, as and for the purpose herein specified.

3. The attaching of the teat-tubes I to the horizontal tubes $H'$ of the pan or receptacle A by means of hooks $i\ i$, attached to rings J on the lower ends of the teat-tubes, and which hooks are fitted over the edges of plate $g$, secured to the parts $f$ of the tubes $H'$, as herein set forth.

L. O. COLVIN.

Witnesses:
A. R. HAIGHT,
J. W. COOMBS.